US010863586B2

(12) United States Patent
Zhao et al.

(10) Patent No.: US 10,863,586 B2
(45) Date of Patent: Dec. 8, 2020

(54) ELECTRICAL CONDUCTIVE RESIN MATRIX FOR CNT HEATER

(71) Applicant: Goodrich Corporation, Charlotte, NC (US)

(72) Inventors: Wenping Zhao, Glastonbury, CT (US); Zaffir A. Chaudhry, S. Glastonbury, CT (US); Galdemir Cezar Botura, Akron, OH (US); Tommy M. Wilson, Jr., Cuyahoga Falls, OH (US); Brad Hartzler, Doylestown, OH (US); Jin Hu, Hudson, OH (US)

(73) Assignee: Goodrich Corporation, Charlotte, NC (US)

( * ) Notice: Subject to any disclaimer, the term of this patent is extended or adjusted under 35 U.S.C. 154(b) by 761 days.

(21) Appl. No.: 15/385,483

(22) Filed: Dec. 20, 2016

(65) Prior Publication Data

US 2018/0176993 A1  Jun. 21, 2018

(51) Int. Cl.
*H05B 3/14* (2006.01)
*B05D 3/00* (2006.01)
(Continued)

(52) U.S. Cl.
CPC ............ *H05B 3/145* (2013.01); *B05D 3/007* (2013.01); *B64D 15/12* (2013.01); *C01B 32/168* (2017.08);
(Continued)

(58) Field of Classification Search
CPC ...... H05B 3/145; H05B 3/36; H05B 2214/04; H05B 2214/02; H05B 2203/017; B64D 15/12; C08J 5/042; C08J 2363/00; C08J 2300/22; C08J 2300/24; C08J 2367/04; C01B 32/168; C01B 2202/22; C01B 2202/24; C01B 32/184; C01B 32/05; C01B 32/16; B05D 3/007; C08K 3/04; C08K 3/08; C08K 2201/001; C08K 2003/0806; C08K 2003/0831; C08K 2003/085; C08K 5/13; B32B 2379/08; B32B 9/007; B82Y 30/00; Y10S 977/742; Y10S 977/753; Y10S 977/847; Y10S 977/932; C08L 33/00; C08L 63/10
See application file for complete search history.

(56) References Cited

U.S. PATENT DOCUMENTS 9,137,857 B2 * 9/2015 Feng .................. H05B 3/34
9,198,232 B2   11/2015 Lashmore et al.
(Continued)

FOREIGN PATENT DOCUMENTS

DE       10151298 A1    4/2003
DE    102007057491 A1    6/2009

OTHER PUBLICATIONS

Extended European Search Report for EP Serial No. 17209040.9, dated May 4, 2018, 6 Pages.

*Primary Examiner* — Shawntina T Fuqua
(74) *Attorney, Agent, or Firm* — Kinney & Lange, P.A.

(57) ABSTRACT

A method of making a carbon nanotube heater includes impregnating a dry carbon nanotube fiber matrix with a conductive resin, the conductive resin is made of an organic resin and a conductive filler material. The carbon nanotube heater is lightweight, strong, and maintains appropriate electrical conductivity and resistance for use as a heater.

20 Claims, 2 Drawing Sheets

(51) Int. Cl.
*C08K 3/04* (2006.01)
*C08K 3/08* (2006.01)
*H05B 3/36* (2006.01)
*B64D 15/12* (2006.01)
*C08J 5/04* (2006.01)
*C01B 32/168* (2017.01)
*B82Y 40/00* (2011.01)
*B82Y 30/00* (2011.01)

(52) U.S. Cl.
CPC ........... *C08J 5/042* (2013.01); *C08K 3/04* (2013.01); *C08K 3/08* (2013.01); *H05B 3/36* (2013.01); *B82Y 30/00* (2013.01); *B82Y 40/00* (2013.01); *C01B 2202/22* (2013.01); *C01B 2202/24* (2013.01); *C08J 2300/22* (2013.01); *C08J 2300/24* (2013.01); *C08J 2363/00* (2013.01); *C08J 2367/04* (2013.01); *C08K 2003/085* (2013.01); *C08K 2003/0806* (2013.01); *C08K 2003/0831* (2013.01); *C08K 2201/001* (2013.01); *H05B 2203/017* (2013.01); *H05B 2214/02* (2013.01); *H05B 2214/04* (2013.01); *Y10S 977/742* (2013.01); *Y10S 977/753* (2013.01); *Y10S 977/847* (2013.01); *Y10S 977/932* (2013.01)

(56) References Cited

U.S. PATENT DOCUMENTS

| | | |
|---|---|---|
| 9,468,043 B2 | 10/2016 | Heintz et al. |
| 2008/0166563 A1 | 7/2008 | Brittingham et al. |
| 2009/0277897 A1* | 11/2009 | Lashmore ............ H01B 1/04 219/544 |
| 2010/0315105 A1* | 12/2010 | Fornes ................ C09D 7/62 324/693 |
| 2011/0024409 A1 | 2/2011 | Shah et al. |
| 2014/0070054 A1 | 3/2014 | Burton et al. |
| 2016/0221680 A1 | 8/2016 | Burton et al. |

* cited by examiner

ELECTRICAL CONDUCTIVE RESIN MATRIX FOR CNT HEATER

BACKGROUND

An aircraft moving through the air is often subjected to ice formation, and anti-icing or de-icing devices must be used to remove or prevent ice from accumulating on exterior surfaces of the aircraft. For any type of electrical heaters or de-icing heaters, the closer the heater is to the skin of an airfoil, nacelle, nosecone, engine cowl, or other aircraft part, the less power it takes to heat or de-ice the aircraft component due to the proximity of the heater to the external surface. Thus, aerospace applications of de-icing heaters attempt to place those heaters as close to the external surface as possible.

Various types of ice protection systems (IPS) have been developed to protect aircraft from the hazardous effects of icing, including electro-thermal de-icing systems, bleed-air anti-icing systems, and pneumatic boot de-icing systems, among others. Electro-thermal de-icing systems (ETDS) typically use metal wires to melt ice by converting electrical energy to thermal energy. The use of metal wires as resistance elements embedded in de-icing systems presents several problems, including a low durability of the wires, high weight, and minimal power usage efficiency.

Carbon nanotube (CNT) wires have been proposed as an alternative to metal wires in ice protection systems. CNTs are allotropes of carbon having a generally cylindrical nanostructure, and have a variety of uses in nanotechnology, electronics, optics and other materials sciences. CNTs are both thermally and electrically conductive. Due to these properties, CNTs can be used as heaters to prevent icing on aircraft or other vehicles. However, the binder used to apply CNTs to an ice protection system can greatly impact the resulting CNT heater's electrical resistance and overall performance in ice protection.

SUMMARY

A method of making a carbon nanotube heater impregnating the carbon nanotube fiber matrix with a conductive resin matrix, wherein the conductive resin comprises an organic resin and a conductive filler material, and curing the impregnated carbon nanotube fiber matrix.

A heater system includes a carbon nanotube fiber matrix, and a conductive resin matrix. The conductive resin matrix includes an organic resin, and a filler material. The conductive resin impregnates the carbon nanotube fiber matrix.

DETAILED DESCRIPTION

When carbon nanotubes (CNT) are used as a heating element, they are typically bound together by a binder or resin, which is typically a non-conductive "neat" organic resin. If the resin has too high of a resistance, it can negatively impact the CNT heater's overall resistance and create inefficient uses of power when the CNT heater is in use. In this disclosure, a conductive polymer is used as a binder for CNTs (or other nano carbon molecules) to create an electrically conductive CNT heater sheet.

Naturally, CNTs occur as a non-woven network. Thus, for a CNT heating application, a CNT sheet can be bonded within a structure, such as a composite structure. The bonding agent is typically an adhesive film made of an organic resin, such as an epoxy or a phenolic resin. In the prior art, during a resin curing process, the resin impregnates the CNT sheet, which increases the structural integrity of the CNT matrix. However, the impregnation of the CNT matrix with the resin also increases the electrical resistance of the CNT sheet. In some cases, the resistance is increased from 50% to 300% by addition of the resin. Thus, traditional neat organic resins can create resistivity problems with CNT heaters. As an alternative, this disclosure proposes the use of organic resins with conductive particle fillers. The use of conductive organic resins minimizes the change in resistance that occurs when the CNT matrix is impregnated, but still provides the structural integrity required for CNT heaters.

Figure 1:
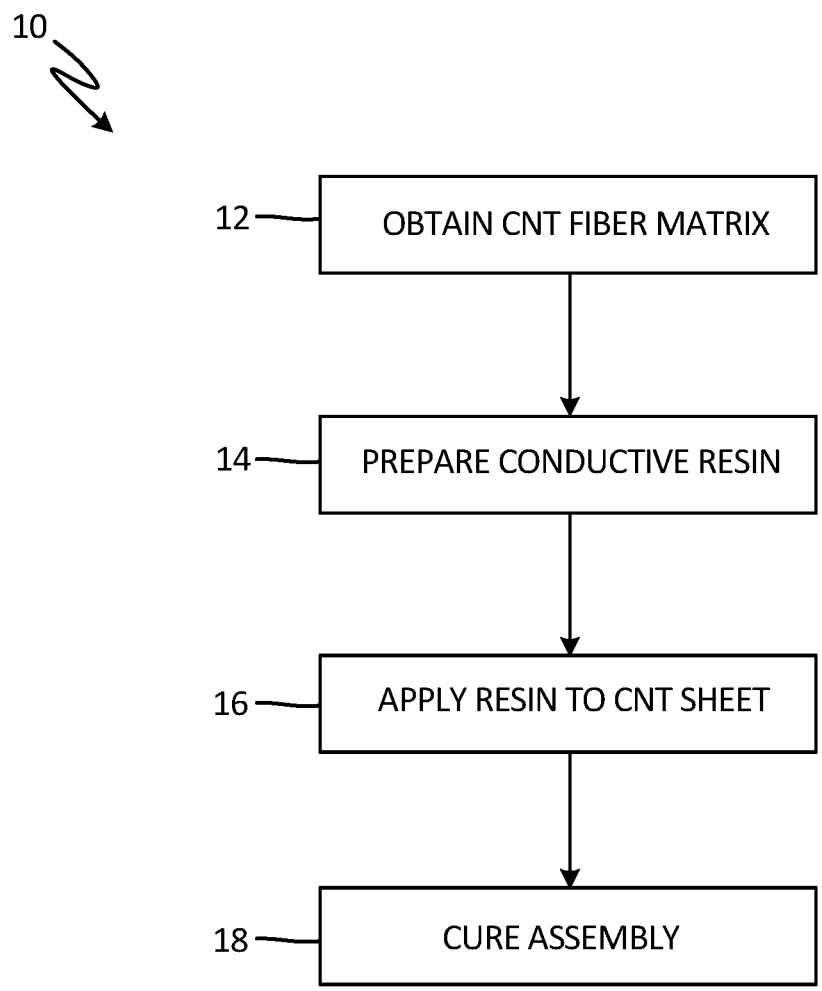
FIG. 1 is a flow chart depicting a method of making a carbon nanotube resin matrix.

FIG. 1 is a flow chart depicting method 10 of making a carbon nanotube resin matrix. Method 10 begins with step 12, obtaining a CNT matrix. The CNT matrix is a "dry" CNT, and has not been impregnated with a resin yet. The CNT matrix is typically not woven, and contains loose CNT fibers.

Next, in step 14, a resin is applied to the CNT matrix. The resin is a conductive resin, made of both an organic resin and a conductive filler material. The conductive resin is prepared prior to application to the CNT matrix by mixing the conductive filler material into the neat organic resin. The organic resin can be an epoxy, phenolic, BMI, polyimide, thermoplastic, PEI, PEEK, or other appropriate material. The filler material can be metallic, such as silver, gold, copper, a metallic alloy, or a non-metallic conductive material. The resin can be applied to the CNT matrix by infiltrating the matrix, or by attaching a film resin to the CNT matrix and heating the assembly.

The application of the conductive resin matrix to the CNT fiber matrix allows for varying resistances along the completed impregnated CNT matrix. The conductive resin has a difference resistance than that of the dry CNT fiber matrix, and adding the conductive resin to the CNT fiber matrix alters the resistance of the CNT matrix. The application of conductive resin to the CNT matrix can be varied, such that the thickness, concentration, or amount of conductive resin is altered along the CNT matrix. This allows for varying resistances along the surface of the CNT matrix, as desired for an aircraft surface or other surface in need of a heater. The resistance of the CNT matrix can also be varied by only applying the conductive resin to certain parts of the matrix.

After the resin is applied to the CNT matrix, the resin matrix can be cured (step 16) to further cement the bond between the CNT fibers and the conductive resin. This consolidates the impregnated CNT matrix and prepares it for application in aerospace or other appropriate technology fields. Once the impregnated CNT matrix is prepared, it can be bonded to other materials, such as metallic skins or protective pre-impregnated fiber glass layers, to create a heating assembly.

The completed CNT resin matrix can be applied to any surface of an aircraft, such as the leading edge of an airfoil, parts of the aircraft engine, the aircraft tail, or other structures which require heating. This CNT resin matrix can replace electrothermal heaters, dual thermal heaters, and other types of heating systems on aircrafts.

Figure 2A:
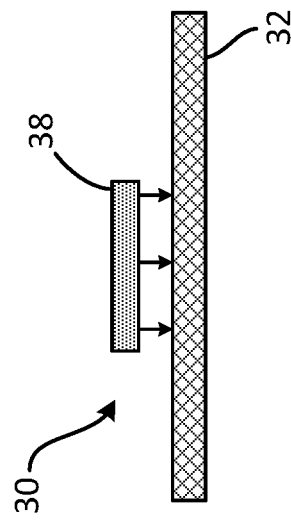
FIGS. 2A-2D are schematic diagrams of an impregnated carbon nanotube matrix in various uses.

FIGS. 2A-D are schematic diagrams depicting a CNT matrix impregnated with a conductive resin in various uses. FIG. 2A shows assembly of impregnated matrix 20. Matrix 20 includes CNT fiber matrix 22 and conductive resin 28, which includes organic resin 24 and conductive filler material 26. Matrix 20 is assembled by impregnating CNT fiber matrix 22 with conductive resin 28. The impregnating step is represented by arrows, and discussed in reference to FIG. 1.

CNT fiber matrix 22 are a dry fiber matrix that is non-woven. This type of CNT matrix is commercially available. CNT fiber matrix 22 are both electrically conductive and thermally conductive, making CNT fiber matrix 22 good heating elements for ice protection or other heating uses.

Organic resin 24 is a traditional resin, such as an epoxy, phenolic, bismaleimide (BMI), polyimide, thermoplastic, polyetherimide (PEI), polyether ether ketone (PEEK), or other appropriate material. Organic resin 24 by itself is not conductive. When conductive filler material 26 is added to organic resin 24, a conductive resin 28 is formed, which is used to impregnate CNT fiber matrix. Inserting conductive resin 28 into CNT fiber matrix allows for CNT structural integrity, but maintains electrical conductivity and more consistent resistance if conductive filler material 26 is in organic resin 24.

Conductive filler material 26 is a conductive material used to make organic resin 28 electrically conductive. Conductive filler material 26 can be metallic, such as silver, gold, copper, or an alloy. Alternatively, conductive filler material 26 can be another appropriate conductive material. The addition of conductive filler material 26 to organic resin 24 minimizes the change in resistance that occurs when CNT fiber matrix 22 are impregnated. In the prior art, the resistance of a CNT fiber matrix would change between 50% and 300% when the CNT fiber matrix was impregnated with a neat organic resin.

When CNT fiber matrix 22 and conductive resin 28 are combined into impregnated CNT matrix 20, the resulting CNT heater is structurally sound, but the resistance of CNT fiber matrix 22 is not significantly altered by the addition of conductive resin 28.

Figure 2B:
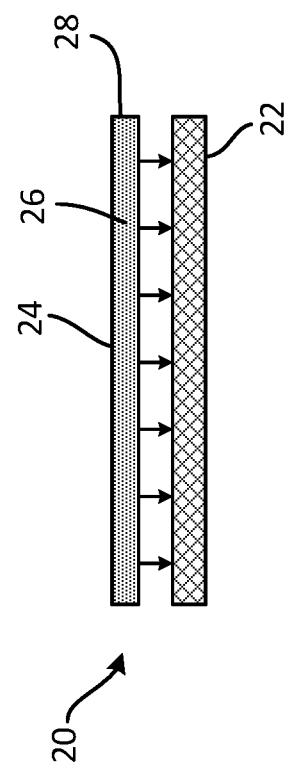

FIG. 2B shows an alternative embodiment of impregnated matrix 30, containing CNT fiber matrix 32 and conductive resin 38. Similar to FIG. 2A, conductive resin 38 contains an organic resin and a conductive filler. In this embodiment, CNT fiber matrix 32 is impregnated (shown by arrows) with a smaller amount of conductive resin 38. Thus, conductive resin 38 only impregnates a section of CNT fiber matrix 32, instead of all of CNT fiber matrix 22. This creates a highly electrically conductive zone where CNT fiber matrix 32 is impregnated with conductive resin 38.

Figure 2C:
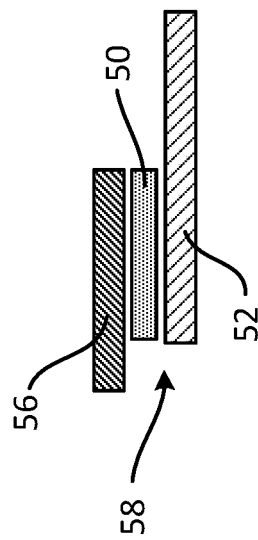

FIG. 2C shows CNT heater assembly 48 where conductive resin 40 is used to connect CNT fiber matrixes 42, 44, to each other. As with earlier figures, conductive resin 40 contains an organic resin and a conductive filler. In heater assembly 48, conductive resin 40 can be used as a connector to join two or more CNT sheet heaters with each other. An alternative use for the conductive resin for CNT heaters is for repairing CNT heaters. The conductive resin can be used to make a connection between repaired areas of a CNT heater and undamaged areas of a CNT heaters. The conductive resin could also be used to repair non-CNT heaters, such as metallic heaters.

Figure 2D:
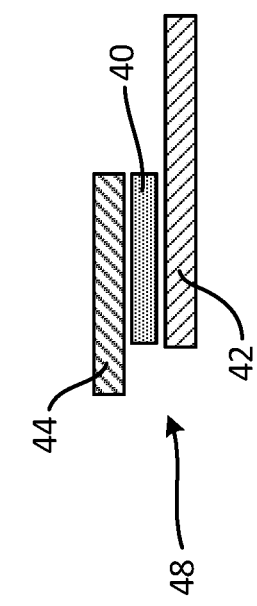

FIG. 2D shows CNT heater assembly 58 where conductive resin 50 is used to connect CNT fiber matrix 52 to bus bar 56. As with earlier figures, conductive resin 50 contains an organic resin and a conductive filler. Bus bar 56 is metallic. Bus bar 56 allows CNT heater assembly 58 to make electrical connection with wires, electronics, or other devices. Thus, conductive resin 50 could also be used as a binder to connect CNT heater sheets to external electrical wiring.

This impregnated CNT matrix is lighter weight, lower mass, and stronger than previous heater types. The proposed conductive resin used to impregnate CNT heaters will reduce the impact of the resin on the electrical resistance of the resulting CNT heater, while maintaining the structural benefits of a traditional neat organic resin. This conductive resin can also be used for other CNT heater applications, such as joining CNT heaters together and repairing damaged CNT heaters, without significantly altering the resistance of the CNT heaters.

DISCUSSION OF POSSIBLE EMBODIMENTS

The following are non-exclusive descriptions of possible embodiments of the present invention.

A method of making a carbon nanotube heater includes impregnating the carbon nanotube fiber matrix with a conductive resin matrix, wherein the conductive resin comprises an organic resin and a conductive filler material, and curing the impregnated carbon nanotube fiber matrix.

The method of the preceding paragraph can optionally include, additionally and/or alternatively, any one or more of the following features, configurations and/or additional components:

The method includes varying the resistance of the carbon nanotube fiber matrix along a length of the carbon nanotube fiber matrix by adjusting the amount of conductive resin matrix applied to the carbon nanotube fiber matrix.

The method includes joining a second impregnated carbon nanotube fiber matrix to the first impregnated carbon nanotube fiber matrix with the conductive resin.

The method includes repairing the impregnated carbon nanotube fiber matrix with the conductive resin.

The carbon nanotube fiber matrix is non-woven.

The organic resin is selected from the group consisting of an epoxy, a phenolic, a bismaleimide, a polyimide, a thermoplastic, a polyetherimide, a polyetheretherketone, and a polyetherketone.

The filler material is silver, gold, copper, or an alloy thereof.

Impregnating the carbon nanotube fiber matrix with a conductive resin matrix comprises infiltrating the carbon nanotube fiber matrix.

Impregnating the carbon nanotube fiber matrix with a conductive resin matrix comprises attaching the conductive resin as a film resin to the carbon nanotube fiber matrix and heating the film resin and carbon nanotube fiber matrix.

Impregnating the carbon nanotube fiber matrix with a conductive resin matrix comprises applying the conductive resin to a first portion of the carbon nanotube fiber matrix, and wherein a second portion of the carbon nanotube fiber matrix is not impregnated.

The method includes applying the impregnated carbon nanotube matrix to a bus bar prior to curing the impregnated carbon nanotube fiber matrix A heater system includes a carbon nanotube fiber matrix, and a conductive resin matrix. The conductive resin matrix includes an organic resin, and a filler material. The conductive resin impregnates the carbon nanotube fiber matrix.

The heater system of the preceding paragraph can optionally include, additionally and/or alternatively, any one or more of the following features, configurations and/or additional components:

The carbon nanotube fiber matrix is non-woven.

The organic resin is selected from the group consisting of an epoxy, a phenolic, a bismaleimide, a polyimide, a thermoplastic, a polyetherimide, a polyetheretherketone, and a polyetherketone.

The filler material is silver, gold, copper, or an alloy thereof.

The amount of conductive resin impregnating the carbon nanotube fiber matrix varies along a length of the carbon nanotube fiber matrix.

The heater system includes a second carbon nanotube fiber matrix impregnated by the conductive resin, the second carbon nanotube fiber matrix connected to the first carbon nanotube fiber matrix by the conductive resin.

The carbon nanotube fiber matrix is partially impregnated with the conductive resin, resulting in at least one portion of the carbon nanotube fiber matrix without conductive resin.

The heater system includes a damaged portion of the carbon nanotube fiber matrix repaired by the conductive resin.

The heater system includes a bus bar attached to the impregnated carbon nanotube fiber matrix.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a carbon nanotube heater comprises:
    impregnating a carbon nanotube fiber matrix with a conductive resin matrix, wherein the conductive resin matrix comprises an organic resin and a conductive particle filler material; and
    curing the impregnated carbon nanotube fiber matrix.

2. The method of claim 1, further comprising varying the resistance of the carbon nanotube fiber matrix along a length of the carbon nanotube fiber matrix by adjusting the amount of conductive resin matrix applied to the carbon nanotube fiber matrix.

3. The method of claim 1, further comprising joining a second impregnated carbon nanotube fiber matrix to the first impregnated carbon nanotube fiber matrix with the conductive resin.

4. The method of claim 1, further comprising repairing the impregnated carbon nanotube fiber matrix with the conductive resin.

5. The method of claim 1, wherein the carbon nanotube fiber matrix is non-woven.

6. The method of claim 1, wherein the organic resin is selected from the group consisting of an epoxy, a phenolic, a bismaleimide, a polyimide, a thermoplastic, a polyetherimide, a polyetheretherketone, and a polyetherketone.

7. The method of claim 1, wherein the conductive particle filler material is silver, gold, copper, or an alloy thereof.

8. The method of claim 1, wherein impregnating the carbon nanotube fiber matrix with a conductive resin matrix comprises infiltrating the carbon nanotube fiber matrix.

9. The method of claim 1, wherein impregnating the carbon nanotube fiber matrix with a conductive resin matrix comprises attaching the conductive resin as a film resin to the carbon nanotube fiber matrix and heating the film resin and carbon nanotube fiber matrix.

10. The method of claim 1, wherein impregnating the carbon nanotube fiber matrix comprises applying the conductive resin to only a first portion of the carbon nanotube fiber matrix.

11. The method of claim 1, further comprising applying the impregnated carbon nanotube matrix to a bus bar prior to curing the impregnated carbon nanotube fiber matrix.

12. A heater system comprising:
    a carbon nanotube fiber matrix; and
    a conductive resin matrix comprising:
        an organic resin, and
        a conductive particle filler material, wherein the carbon nanotube fiber matrix is impregnated with the conductive resin matrix.

13. The heater system of claim 12, wherein the carbon nanotube fiber matrix is non-woven.

14. The heater system of claim 12, wherein the organic resin is selected from the group consisting of an epoxy, a phenolic, a bismaleimide, a polyimide, a thermoplastic, a polyetherimide, a polyetheretherketone, and a polyetherketone.

15. The heater system of claim 12, wherein the conductive particle filler material is silver, gold, copper, or an alloy thereof.

16. The heater system of claim 12, wherein the amount of conductive resin impregnating the carbon nanotube fiber matrix varies along a length of the carbon nanotube fiber matrix.

17. The heater system of claim 12, further comprising a second carbon nanotube fiber matrix impregnated by the conductive resin, the second carbon nanotube fiber matrix connected to the first carbon nanotube fiber matrix by the conductive resin.

18. The heater system of claim 12, wherein the carbon nanotube fiber matrix is partially impregnated with the conductive resin, resulting in at least one portion of the carbon nanotube fiber matrix without conductive resin.

19. The heater system of claim 12, further comprising a damaged portion of the carbon nanotube fiber matrix repaired by the conductive resin.

20. The heater system of claim 12, further comprising a bus bar attached to the impregnated carbon nanotube fiber matrix.

* * * * *